(12) United States Patent
Ortega Moreno

(10) Patent No.: US 10,520,049 B2
(45) Date of Patent: Dec. 31, 2019

(54) MECHANISM FOR PROGRESSIVE BRAKING

(71) Applicant: Lucio Antonio Ortega Moreno, Valdetorres de Jarama (ES)

(72) Inventor: Lucio Antonio Ortega Moreno, Valdetorres de Jarama (ES)

(*) Notice: Subject to any disclaimer, the term of this patent is extended or adjusted under 35 U.S.C. 154(b) by 108 days.

(21) Appl. No.: 15/742,922

(22) PCT Filed: Jul. 7, 2016

(86) PCT No.: PCT/ES2016/070510
§ 371 (c)(1),
(2) Date: Jan. 9, 2018

(87) PCT Pub. No.: WO2017/009503
PCT Pub. Date: Jan. 19, 2017

(65) Prior Publication Data
US 2018/0216679 A1    Aug. 2, 2018

(30) Foreign Application Priority Data

Jul. 10, 2015 (ES) .................................. 201531000

(51) Int. Cl.
*F16D 55/226* (2006.01)
*F16D 65/18* (2006.01)
*F16D 121/04* (2012.01)

(52) U.S. Cl.
CPC ........... *F16D 55/226* (2013.01); *F16D 65/18* (2013.01); *F16D 2121/04* (2013.01)

(58) Field of Classification Search
CPC ........... F16D 55/226; F16D 2055/0008; F16D 2121/04; F16D 55/2262; F16D 65/18; F16D 65/183; F16D 66/00
See application file for complete search history.

(56) References Cited

U.S. PATENT DOCUMENTS 2,419,113 A    4/1947  Bricker
2,988,176 A *  6/1961  Du Bois ................. F16D 55/32
                                                 188/152

(Continued)

FOREIGN PATENT DOCUMENTS

GB          732950       6/1955
JP     2004284507 A  * 10/2004
SU       1052431 A  * 11/1983

*Primary Examiner* — Bradley T King
*Assistant Examiner* — Mahbubur Rashid
(74) *Attorney, Agent, or Firm* — Hoffmann & Baron, LLP

(57) ABSTRACT

The invention relates to a mechanism (1) for progressive braking, applicable to brakes comprising friction elements (2) secured to the vehicle (3), which act on frictional tracks (4) secured to the wheels, the friction elements (2) being actuated by means of a primary hydraulic circuit (5), where the friction elements (2) comprise primary sectors (2*a*) actuated by the primary hydraulic circuit (5), and secondary sectors (2*b*) actuated by a secondary hydraulic circuit (6), while said friction elements (2) are mounted on the vehicle by means of attachment means (7) that can be partially moved in the direction of the frictional tracks (4), the partially movable attachment means (7) being associated with at least one hydraulic actuator (8), which regulates the pressure in the secondary hydraulic circuit (6) in order to regulate the braking pressure of the secondary sectors (2*b*) according to the movement of the friction elements (2).

11 Claims, 3 Drawing Sheets

(56) References Cited

U.S. PATENT DOCUMENTS

| | | | | |
|---|---|---|---|---|
| 3,277,982 A | * | 10/1966 | Kimberlin | F16D 65/18 188/346 |
| 3,502,181 A | * | 3/1970 | Lepelletier | B60T 13/02 188/345 |
| 3,773,148 A | * | 11/1973 | Jean-Claude | F16D 65/18 188/72.4 |
| 3,923,345 A | | 12/1975 | Poggie | |
| 4,865,164 A | * | 9/1989 | Kaneda | B60T 13/02 188/141 |
| 5,036,960 A | * | 8/1991 | Schenk | F16D 55/226 188/346 |
| 5,168,966 A | * | 12/1992 | Thioux | B60T 8/52 188/141 |
| 5,279,394 A | * | 1/1994 | Wollenweber | B60T 8/52 188/1.11 E |
| 5,379,868 A | * | 1/1995 | Kurasako | B60T 8/52 188/346 |
| 5,544,724 A | * | 8/1996 | Kurasako | B60T 11/28 188/72.2 |
| 6,250,437 B1 | * | 6/2001 | Wang | B24B 7/17 188/71.1 |
| 6,412,612 B1 | * | 7/2002 | Parsons | B60T 13/22 188/170 |
| 2009/0005939 A1 | * | 1/2009 | Dueckinghaus | A01D 41/1274 701/50 |

* cited by examiner

MECHANISM FOR PROGRESSIVE BRAKING

CROSS REFERENCE TO RELATED APPLICATIONS

The present application is a United States national stage of PCT Application No. PCT/ES2016/070510, filed Jul. 7, 2016, which in turn claims the benefit of priority to Spanish Application Serial No. P201531000, filed Jul. 10, 2015. Applicant claims the benefits of 35 U.S.C. § 120 to the PCT application and priority under 35 U.S.C. § 119 to the Spanish application, and the entire disclosures of both applications are herein incorporated by reference in their entireties.

OBJECT OF THE INVENTION

The present invention relates to a mechanism for progressive braking, which is applicable to vehicle brakes.

BACKGROUND OF THE INVENTION

Currently, there exist anti-lock braking devices for vehicles, popularly known as ABS, which act on brakes of the type that comprise friction elements secured to the vehicle, usually brake pads mounted on the corresponding vehicle sleeve or bushing by means of calipers; these friction elements actuate frictional tracks secured to the wheels— usually brake discs—, and are actuated by means of a primary hydraulic circuit that is controlled by the brake pedal whilst driving, very often with the aid of an intensifier or assistant that amplifies the pressure implemented on the pedal such that the braking pressure exerted by the friction elements is capable of performing effective braking without requiring excessive force on the pedal.

The action of this type of assisted braking is sometimes so potent that it may cause one or more wheels to lock up, especially on low-grip surfaces or in limit brakings. This situation reduces safety, since, except in the case of dry, optimal-grip surfaces and other situations, such as newly-fallen snow that may accumulate in front of the wheels when braking, the sliding increases the car stopping distance, thereby increasing the risk of collision, and, no less significantly, decreases vehicle stability, due to the loss of directional capabilities caused by the front wheels (which are those primarily responsible for braking) losing grip or to the displacement of the rear part of the vehicle caused by the rear wheels losing grip, or to both effects simultaneously.

Precisely in order to solve this problem, anti-lock braking systems were designed that currently operate exclusively with electronic regulation, wherein sensors placed on the wheels (currently one on each wheel, although the early versions of these systems implemented sensors only for the rear axle) take continuous measurements (several times per second) of the wheel rotation speed, and send them to a control unit, which, if it detects a deceleration greater than certain pre-determined limits for effective braking, actuates solenoid valves inserted in the corresponding primary hydraulic circuit of each wheel, such that they open and release the braking pressure, thereby causing the wheel to recover its grip. As in the case of the sensor readings, the action of these valves is performed several times per second, which is noticed in the brake pedal as a clicking sound.

These electronically-regulated systems have various disadvantages, which include:

The sensors used are capacitive sensors, which are designed to prevent wearing elements, but nonetheless undergo changes in operation and failures due to temperature changes and hysteresis that may affect the correct operation of the system.

The electronic elements used are susceptible to electrical failures, even more so in environments with high static electricity, such as a moving vehicle supported on the ground by means of electrically-insulated tyres.

It is a very intrusive system, which is clearly perceptible to the drivers without them being capable of acting on it.

Since it is an electronic aid, its use in competitions, such as car races (Formula 1®), is not permitted.

DESCRIPTION OF THE INVENTION

The configuration of the mechanism of the invention makes it possible to implement progressive braking, overall dispensing with electronic controls that are susceptible to failure and sensors that are sensitive to temperature changes and hysteresis, and which may be used in competitions, since it is not an electronic aid. Moreover, as unexpected advantages, smoother braking and better ventilation and cooling of the brakes have been detected.

The mechanism for progressive braking of the invention is applied to brakes of the type that comprise friction elements secured to the vehicle, which actuate frictional tracks secured to the wheels, said friction elements being actuated by means of a primary hydraulic circuit. In the present document, "frictional tracks secured to the wheels" is understood to mean that they rotate jointly with them, such as, for example, with brake discs mounted on a bushing, whereon, in turn, the corresponding wheels are mounted.

Using this basic configuration, according to the invention, it is envisaged that the friction elements will comprise primary sectors actuated by means of the primary hydraulic circuit and secondary sectors actuated by, at least, one secondary hydraulic circuit.

Said friction elements are mounted on the vehicle through attachment means that may be partially moved in the direction of rotation of the frictional tracks, the attachment means being associated with, at least, one hydraulic actuator that regulates the pressure in the secondary hydraulic circuit according to the movement of these friction elements, such that, when the brake pedal is pushed down, the friction elements come closer to the frictional tracks, and the push causes dragging of the friction elements in the direction of rotation or movement of the frictional tracks and, therefore, of their attachment means as well.

The attachment means may be partially moved, i.e. their partial movement is limited, since, otherwise, effective braking would not take place, and they follow the direction and the rotation of the frictional tracks such that they do not stop actuating them during this movement. The variable movement of the attachment means—according to the braking friction applied—influences the hydraulic actuator, which is calibrated such that, in the event of excessive movement, compatible with conditions of lock-up or close thereto, it may regulate the pressure in the secondary hydraulic circuit, thereby reducing the braking pressure applied on the braking tracks by the secondary sectors of the friction elements; such regulation is automatic, since the movement of the attachment means and the regulation of the secondary hydraulic circuit by the hydraulic actuator are proportional to the braking intensity, which provides effective regulation of the braking. Moreover, the partial separation of the secondary sectors and the decrease in friction contribute to better ventilation of the brakes.

In the present document, when reference is made to the fact that the friction elements are mounted on the vehicle through attachment means that may be partially moved in the direction of the frictional tracks, it is understood that this may refer to all the friction elements or only to some of them, whilst the rest may be mounted without the involvement of the partially moveable means. I.e., for example, in disc brakes wherein the friction elements are brake pads mounted on a caliper, and the braking track is formed by the sides of a brake disc, at least two calipers with the corresponding pads may be implemented, wherein only one of the calipers, associated with the hydraulic actuator, is mounted through partially moveable attachment means.

DESCRIPTION OF AN EMBODIMENT OF THE INVENTION

Figure 3:
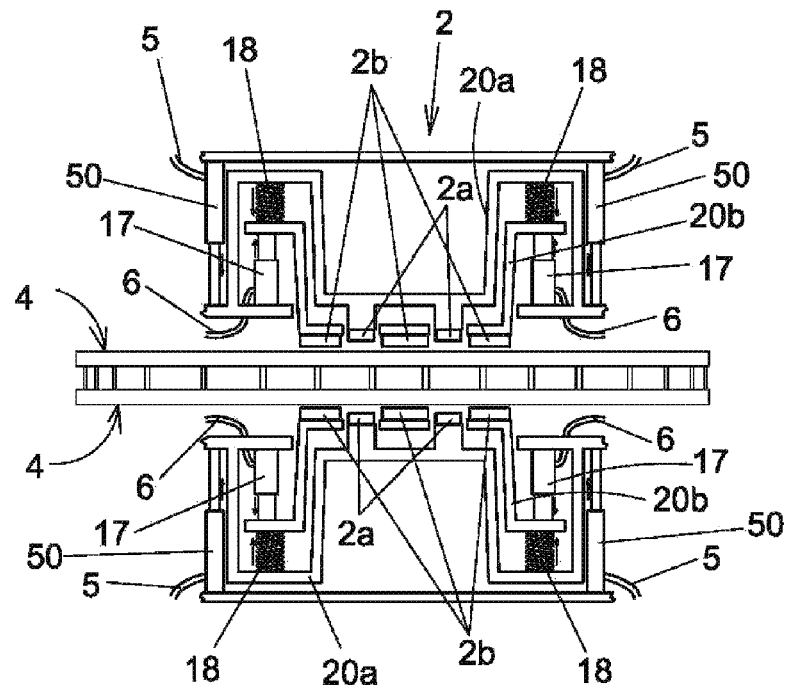
FIG. 3 shows a detailed view of the friction elements, with the primary and secondary sectors thereof, for an embodiment wherein the secondary sectors are mounted on secondary supports and the primary sectors are mounted on primary supports, the secondary supports being mounted on the primary supports by means of pistons actuated by the hydraulic actuator and of regenerative springs.
Figure 4:
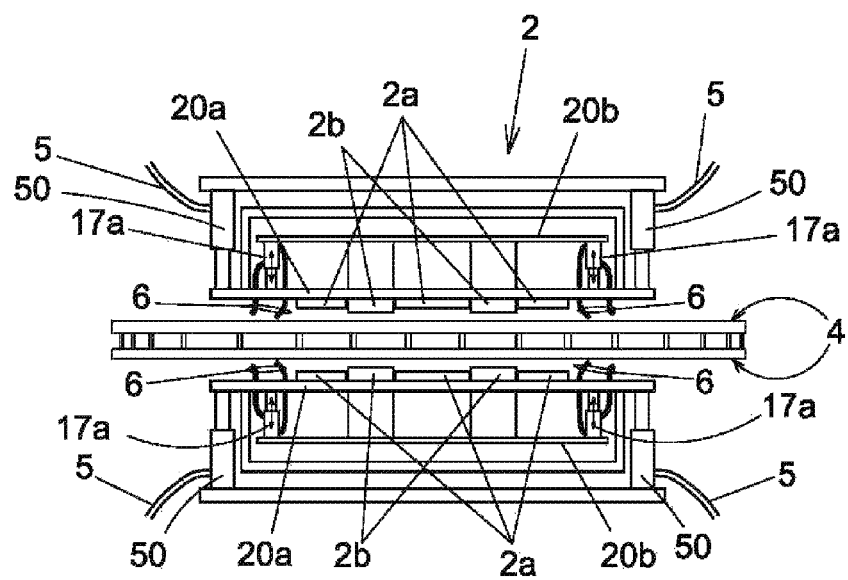
FIG. 4 shows a view similar to that shown in FIG. 3, for another embodiment, wherein the secondary supports are mounted on the primary supports by means of double-effect pistons.

The mechanism (1) for progressive braking of the invention is applied to brakes of the type that comprise friction elements (2) secured to the vehicle (3) which actuate frictional tracks (4) secured to the wheels, the friction elements (2)—for example, brake calipers with the corresponding pads, as shown in the figures, and wherein the frictional tracks (4) are the sides of brake discs—being actuated by means of a primary hydraulic circuit (5) with the corresponding cylinders (50) (see FIGS. 3 and 4).

Figure 5:
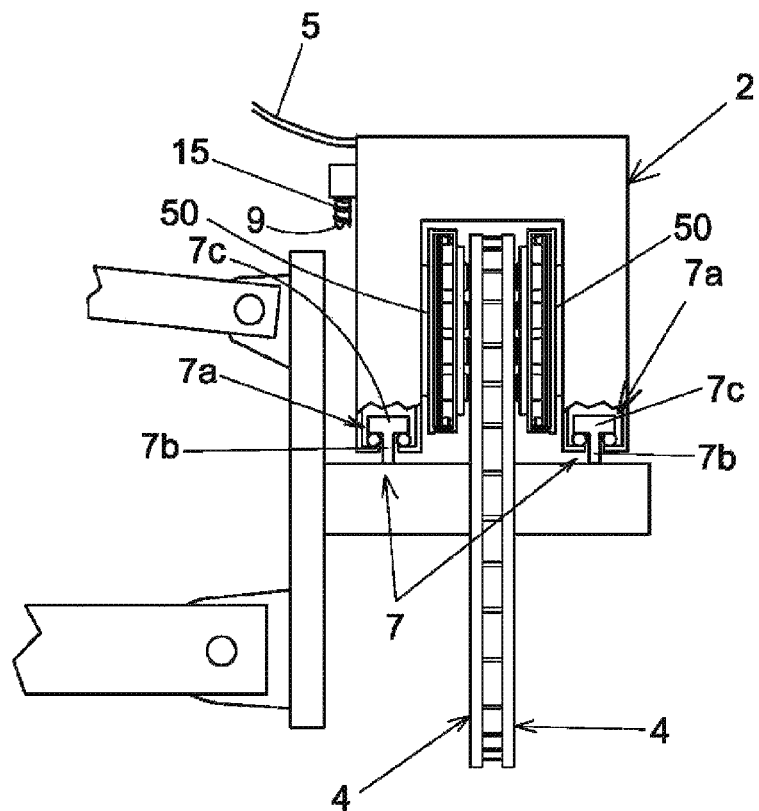
FIG. 5 shows a detail of the partially moveable attachment elements, in a front view of a brake disc mounted on a bushing.
Figure 6:
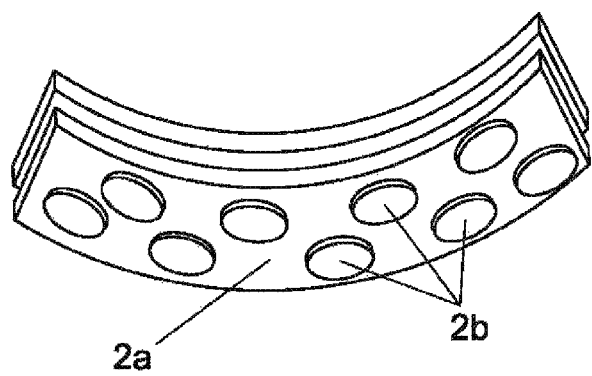
FIG. 6 shows a partial detail of a friction element of the mechanism of the invention in the form of a brake pad, wherein the primary and secondary sectors may be observed.

According to the invention, the friction elements (2) comprise primary sectors (2a) actuated by the primary hydraulic circuit (5) and secondary sectors (2b) actuated by, at least, one secondary hydraulic circuit (6); and said friction elements (2) are mounted on the vehicle through attachment means (7) that may be partially moved in the direction of rotation of the frictional tracks (4) (see these means in FIG. 5).

The partially moveable attachment means (7) are associated with, at least, one hydraulic actuator (8) (see FIG. 2), which regulates the pressure in the secondary hydraulic circuit (6), in order to regulate the braking pressure of the secondary sectors (2b) according to the movement of the friction elements (2). Said partially moveable attachment means (7) comprise, for example, rails (7a) through which slide carriages (7b) equipped with derailment retainers (7c) travel, as may be seen in FIG. 5.

Figure 1:
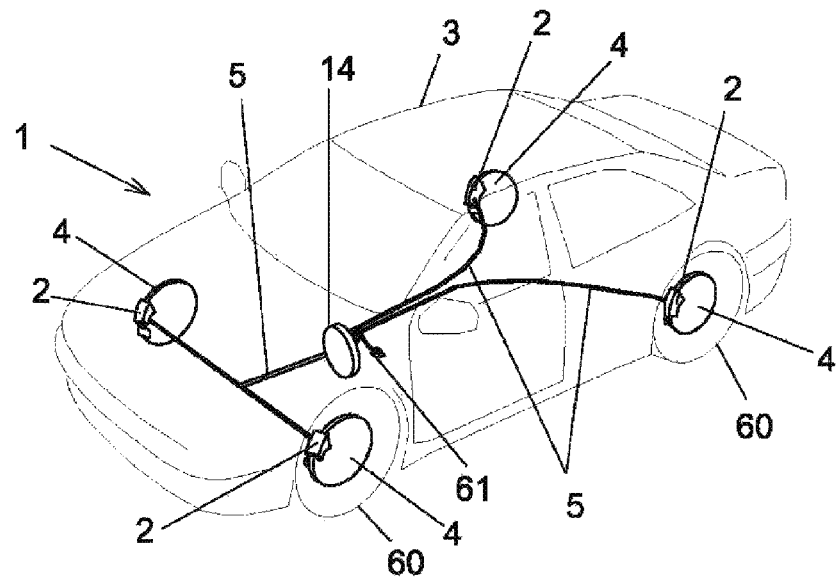
FIG. 1 shows a view of a vehicle that incorporates the mechanism of the invention.
Figure 2:
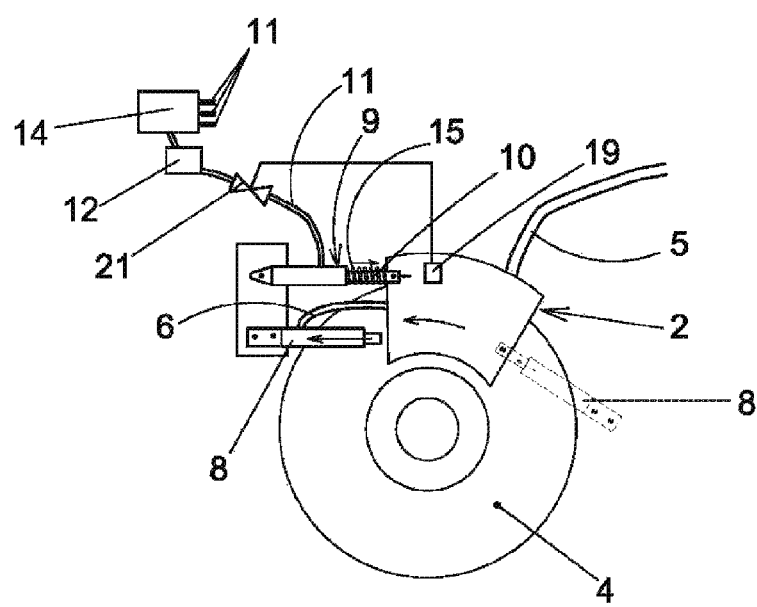
FIG. 2 shows a detail of the general elements of a wheel brake according to the mechanism of the invention.

Moreover, it is envisaged that the partially moveable attachment means (7) will be associated with, at least, one motion damper (9) (go back to FIG. 2), which, in these examples of the invention, comprises, at least, one piston (10) connected to a third hydraulic circuit (11) equipped with pressure regulator elements (12), such that, by actuating these pressure regulator elements (12), the movement of the attachment means (7) may be regulated according to the braking force or friction, in order to, for example, adjust to dry or wet conditions. Moreover, it is envisaged that said pressure regulator elements (12) of the third hydraulic circuits (11), corresponding to each of the wheels (60), will be connected through a brakeforce distributor (14), as shown in FIGS. 1 and 2, such that the action of the mechanism (1) on the different wheels (60) may be co-ordinated. Moreover, the brakeforce distributor (14) may be associated with a hydraulically-operated self-locking differential, not represented, such that the mechanism may interact with the traction on the drive wheels.

Moreover, in the invention it is envisaged that the partially moveable attachment means (7) will be associated with, at least, one recovery element (15), such that, when action on the brake pedal (61) ceases, the resting position is recovered. Said recovery element (15) and the motion damper (9) are preferably mounted coaxially, as shown in FIG. 2.

On the other hand, the primary sectors (2a) are mounted on primary supports (20a) (see FIGS. 3 and 4), whereas the secondary sectors (2b) are mounted on secondary supports (20b), the secondary supports—for each wheel—(20b) being moveably mounted on the primary supports (20a). For example, FIG. 3 shows an embodiment wherein the secondary supports (20b) are mounted on the primary supports (20a) by means of pistons (17) actuated by the corresponding hydraulic actuator—that of the same wheel—(8) by means of the corresponding secondary hydraulic circuit (6), and of regenerative springs (18). Moreover, in this case, the hydraulic actuator (8) in each wheel operates under compression, i.e. ahead with respect to the direction of rotation of the wheel, although it may also operate under extension (behind with respect to the direction of rotation of the wheel) by attaching it to the friction elements (2), a variant that is not represented in the figures. Moreover, in said FIG. 3, the pistons (17) cause the opening of the secondary sectors (2b)—thereby reducing the braking pressure—and the regenerative springs (18) cause the closing thereof. In this manner, if the braking is too intense, the braking pressure decreases when the secondary sectors (2b) are opened, and the affected wheel (60) recovers its grip. The operation may also have the reverse configuration, which is not represented.

In FIG. 4, another configuration is envisaged, wherein the secondary supports (20b) are mounted on the primary supports (20a) by means of double-effect pistons (17a), and which comprises two hydraulic actuators (8) in each wheel, one of them operating on one of the directions of the double-effect pistons (17a), and the other operating on the opposite direction, such that excessive intensification of the braking causes the secondary sectors (2b) to open, and vice-versa. The second hydraulic actuator (8) is outlined with a dashed line in FIG. 2.

In any case, as an additional feature of the invention, it is envisaged that, in the resting position, the secondary sectors (2b) will be slightly ahead with respect to the primary sectors (2a), as shown in FIGS. 3 and 4, thereby leading to a more progressive braking in the beginning. In any case, the movement of the partially moveable attachment means (7) at the beginning of the braking contributes to its progressiveness.

Finally, the invention envisages the additional use of temperature sensors (19), applied in FIG. 2 to the calipers of the friction elements, although they may also be applied to the sectors (2a, 2b) and/or the primary or secondary hydraulic circuits, which are associated with valves (21) inserted in the third hydraulic circuit (11) of each wheel (60), in order to regulate the braking pressure on the corresponding wheel according to the temperature. Said association, which is not represented, may be performed, for example, by means of control electronics.

Having sufficiently described the nature of the invention, as well as the way to implement it, we state that some details of the aforementioned arrangements not represented in the attached drawings may be modified, provided that they do not alter the fundamental principle.

The invention claimed is:

1. A mechanism for progressive braking for brakes comprising friction elements secured to a vehicle having wheels, which act on frictional tracks secured to the wheels, the friction elements being actuated by means of a primary hydraulic circuit; characterized in that the friction elements comprise primary sectors actuated by the primary hydraulic circuit and secondary sectors actuated by, at least, one secondary hydraulic circuit; said friction elements are mounted on the vehicle through attachment means that may be partially moved in the direction of rotation of the frictional tracks; and the partially moveable attachment means are associated with, at least, one hydraulic actuator, which regulates the pressure in the secondary hydraulic circuit, in order to regulate the braking pressure of the secondary sectors according to the movement of the friction elements, wherein the partially moveable attachment means comprise rails through which slide carriages equipped with derailment retainers travel.

2. The mechanism for progressive braking according to claim 1, wherein the partially moveable attachment means are further associated with, at least, one motion damper.

3. The mechanism for progressive braking according to claim 2, wherein the motion damper comprises, at least, one piston connected to a third hydraulic circuit equipped with pressure regulator elements.

4. The mechanism for progressive braking according to claim 3, wherein the pressure regulator elements of the third hydraulic circuits corresponding to each of the wheels are connected by means of a brakeforce distributor.

5. The mechanism for progressive braking according to claim 4, wherein the brakeforce distributor is associated with a hydraulically-operated self-locking differential for the vehicle.

6. The mechanism for progressive braking according to claim 1, wherein the partially moveable attachment means are further associated with, at least, one recovery element.

7. The mechanism for progressive braking according to claim 6, wherein the recovery element and the motion damper are mounted coaxially.

8. The mechanism for progressive braking according to claim 1, wherein the primary sectors are mounted on primary supports, whereas the secondary sectors are mounted on secondary supports; the secondary supports in each wheel being moveably mounted on the primary supports.

9. The mechanism for progressive braking according to claim 8, wherein the secondary supports are mounted on the primary supports by means of pistons actuated by the corresponding hydraulic actuator and of regenerative springs.

10. The mechanism for progressive braking according to claim 8, wherein the secondary supports are mounted on the primary supports by means of double-effect pistons; each wheel comprising two hydraulic actuators, one of them operating on one of the directions of the double-effect pistons and the other operating on the opposite direction.

11. The mechanism for progressive braking according to claim 1, further comprising temperature sensors associated with valves inserted in the third hydraulic circuit of each wheel, in order to regulate the braking pressure in the corresponding wheel according to a temperature.

* * * * *